(12) United States Patent
Motozawa et al.

(10) Patent No.: US 6,203,098 B1
(45) Date of Patent: Mar. 20, 2001

(54) AUTOMOTIVE VEHICLE BODY STRUCTURE DEMONSTRATING A CONTROLLED REACTION LOAD

(75) Inventors: Yasuki Motozawa; Masayoshi Okamoto; Kiyoshi Handa, all of Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/376,098

(22) Filed: Aug. 17, 1999

(30) Foreign Application Priority Data

Aug. 17, 1998 (JP) .................................................. 10-230533
Aug. 17, 1998 (JP) .................................................. 10-230534
Jun. 18, 1999 (JP) .................................................. 11-172019

(51) Int. Cl.$^7$ ........................................................ B60J 7/00
(52) U.S. Cl. .................... 296/189; 296/188; 296/203.01; 293/133
(58) Field of Search .................................. 296/188, 189, 296/194, 203.02, 203.01; 293/133; 188/374, 268

(56) References Cited

U.S. PATENT DOCUMENTS

| | | | |
|---|---|---|---|
| 2,193,949 | * | 3/1940 | Tibbetts ................................ 296/194 |
| 2,965,403 | * | 12/1960 | Barenyl et al. ...................... 296/189 |
| 3,831,997 | * | 8/1974 | Myers .................................. 296/189 |
| 3,848,886 | * | 11/1974 | Feustel et al. ...................... 296/189 |
| 3,912,295 | * | 10/1975 | Eggert .................................. 293/133 |
| 4,152,012 | * | 5/1979 | Reidelbach et al. .................. 293/133 |
| 4,413,856 | * | 11/1983 | McMahan et al. .................... 296/188 |
| 4,702,515 | * | 10/1987 | Kato et al. .......................... 296/189 |
| 4,901,500 | * | 2/1990 | Wycech ................................ 296/189 |
| 5,033,593 | * | 7/1991 | Kazuhito ............................. 296/189 |
| 5,040,646 | * | 8/1991 | Drefahl ................................ 296/189 |
| 5,048,888 | * | 9/1991 | Willy et al. ........................ 296/194 |
| 5,201,912 | * | 4/1993 | Terada et al. ........................ 293/133 |
| 5,224,574 | * | 7/1993 | Thum ................................... 296/189 |
| 5,244,248 | * | 9/1993 | Bovellan .............................. 296/194 |
| 5,429,388 | * | 7/1995 | Wheatley et al. .................... 296/189 |
| 5,566,777 | * | 10/1996 | Trimmer et al. ...................... 296/189 |
| 5,853,195 | * | 12/1998 | Le et al. .............................. 296/189 |
| 5,876,077 | * | 3/1999 | Miskech et al. ...................... 296/189 |
| 5,876,078 | * | 3/1999 | Miskech et al. ...................... 296/188 |
| 6,003,934 | * | 12/1999 | Usui ................................ 296/203.02 |
| 6,068,329 | * | 5/2000 | Miller .................................. 296/188 |

FOREIGN PATENT DOCUMENTS

| | | | |
|---|---|---|---|
| 2 304 651 | | 3/1997 | (GB) . |
| 58-89475 | | 5/1983 | (JP) . |
| 0116268 | * | 7/1983 | (JP) ...................................... 296/189 |
| 4-310477 | | 11/1992 | (JP) . |
| 5-12361 | | 2/1993 | (JP) . |
| 7-101354 | | 4/1995 | (JP) . |
| WO 91/14100 | | 9/1991 | (WO) . |

* cited by examiner

*Primary Examiner*—Joseph D. Pape
*Assistant Examiner*—Kiran B. Patel
(74) *Attorney, Agent, or Firm*—Skjerven Morrill MacPherson LLP

(57) ABSTRACT

In an automotive vehicle body structure, including a longitudinal member having a first portion and a second portion connected in series to provide a controlled reaction force at the time of a vehicle crash, the second portion is adapted to undergo a buckling or collapsing deformation whereby the second portion demonstrating a substantially higher deformation initiating load than a plastic deformation load; and the first portion is adapted to collapse at a deformation initiating load which is substantially lower than the deformation initiating load of the second portion, but substantially higher than the plastic deformation load of the second portion. Thus, the vehicle body demonstrates a high reaction load during an early phase of a vehicle crash, and a low reaction load during a final phase of the crash so that peak acceleration of the vehicle occupant who is restrained by a seat belt involving a certain amount of resiliency can be minimized.

8 Claims, 8 Drawing Sheets

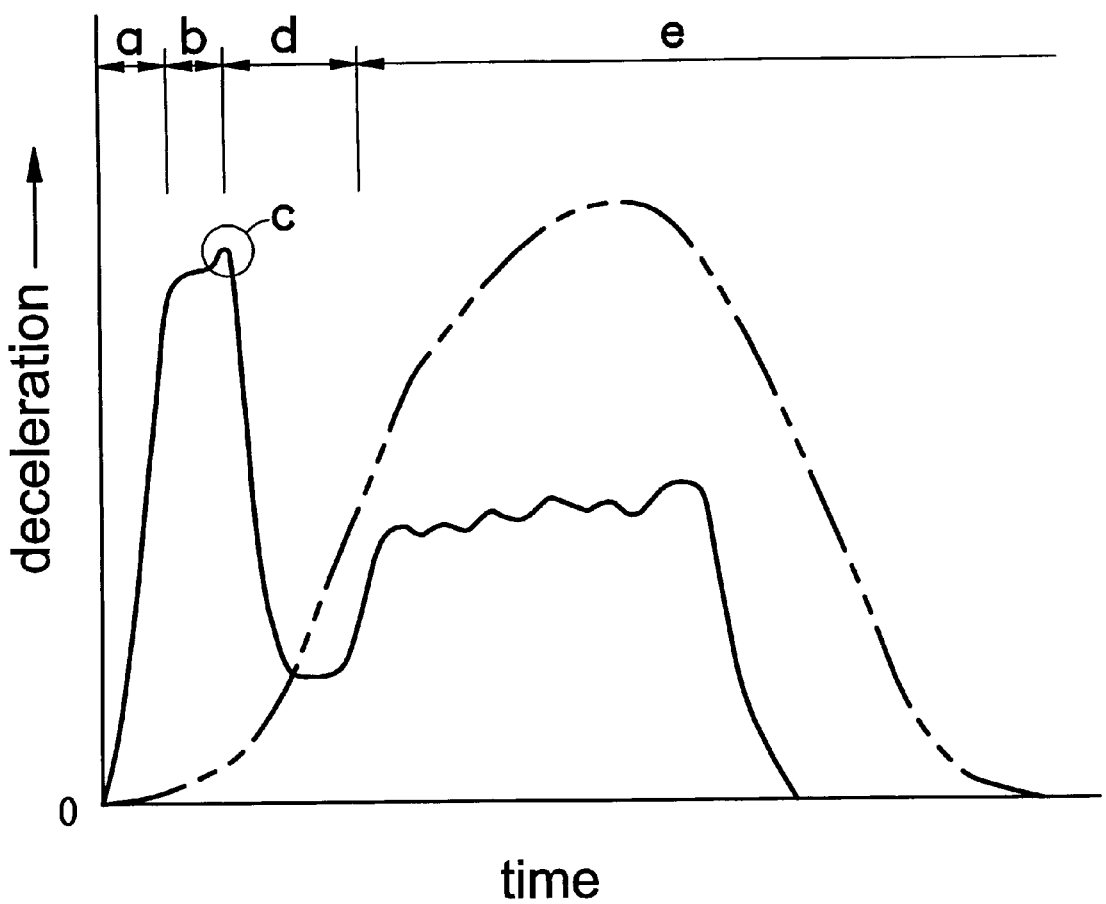

AUTOMOTIVE VEHICLE BODY STRUCTURE DEMONSTRATING A CONTROLLED REACTION LOAD

TECHNICAL FIELD

The present invention relates to an automotive vehicle body structure, and in particular to an automotive vehicle body structure which can minimize the deceleration acting upon vehicle occupants at the time of a vehicle crash.

BACKGROUND OF THE INVENTION

In recent years, various proposals have been made in regard to automotive vehicle body structures to maximize the protection of vehicle occupants at the time of a vehicle crash. For instance, proposals have been made to minimize the deceleration of the part of the vehicle body occupied by vehicle occupants by properly selecting the deformation of the remaining part of the vehicle body, and preventing the former part of the vehicle body from deforming (see Japanese patent laid open publication No. 7-101354, for instance).

When a vehicle occupant is restrained to the seat by a seat belt, the forward inertial force acting upon the vehicle occupant at the time of a vehicle crash starts rising only after the vehicle occupant is fully restrained by the seat belt. Because the seat belt inevitably has a certain resiliency, the deceleration acting on the vehicle occupant reaches a maximum level when the vehicle occupant is thrown forward, and the maximum elongation of the seat belt has occurred. The maximum level is higher as the forward movement of the vehicle occupant under the inertial force increases, and is known to substantially exceed the average deceleration of the vehicle body. Therefore, to minimize the impact which the vehicle occupant receives at the time of a vehicle crash, it is necessary to adjust the time history of the vehicle body deceleration so as to minimize the time delay in the rise in the deceleration of the vehicle occupant with respect to the deceleration of the vehicle body.

Accordingly, by conducting simulations, the inventors have discovered that, for a given deformation stroke of the vehicle body for absorbing the impact of a vehicle crash, the peak value of the deceleration of the vehicle occupant is smaller when the vehicle body deceleration is initially allowed to rise sharply and then gradually reduced to a constant value than when the vehicle body deceleration is kept constant from the early stage of the crash or allowed to rise only gradually.

BRIEF SUMMARY OF THE INVENTION

In view of such problems of the prior art and the recognition by the inventors, a primary object of the present invention is to provide an automotive vehicle body structure which allows the peak deceleration acting upon a vehicle occupant at the time of a vehicle crash to be minimized for a given deformation stroke of the vehicle body.

A second object of the present invention is to provide a vehicle occupant protection system which allows the deceleration acting upon the vehicle occupant at the time of a vehicle crash to be spread over time so as to minimize the peak deceleration acting upon the vehicle occupant.

A third object of the present invention is to provide a vehicle occupant protection system which allows the peak deceleration acting upon the vehicle occupant to be minimized even though the size of the vehicle body is limited.

A fourth object of the present invention is to provide a vehicle occupant protection system which is simple in structure, and may consist of strictly passive elements.

According to the present invention, these and other objects can be accomplished by providing an automotive vehicle body structure, comprising a longitudinal member including a first portion and a second portion connected in series to provide a controlled reaction force at the time of a vehicle crash, characterized by that: the second portion is adapted to undergo a buckling or collapsing deformation whereby the second portion demonstrating a substantially higher deformation initiating load than a plastic deformation load; and the first portion is adapted to collapse at a deformation initiating load which is substantially lower than the deformation initiating load of the second portion, but substantially higher than the plastic deformation load of the second portion.

Thus, the time history of the reaction force can be adjusted by sequentially changing the deformation mode of the reaction force generating member from a collapsing deformation involving a relatively high reaction load to a buckling or a collapsing deformation which has a higher deformation initiating load than the reaction load produced by the first portion, but a substantially lower plastic deformation load. Therefore, the deceleration of the passenger compartment of the vehicle body can be sharply increased in an early phase of a vehicle crash, and, following an interval of a sharp decline, can be kept at a substantially constant level. In particular, if the first portion comprises a stress concentration portion for making the deformation initiating load of the first portion approximately equal to the average reaction load, the deformation initiating load can be reduced, and a constant reaction load can be produced substantially over the entire deformation stroke.

Typically, the first portion comprises a longitudinally extending hollow member which is adapted for a collapsing deformation through uniform creasing of walls thereof. The material preferably consists of aluminum or an aluminum alloy, but may consist of any other materials that demonstrate the required deformation properties. To lower the deformation initiating load of the first portion, and make it substantially equal to the plastic deformation load of the first portion, the first portion may be provided with a stress concentration portion.

The buckling or collapsing deformation of the second portion may be affected in any known arrangements. For instance, the second portion may likewise comprise a longitudinally extending hollow member which is adapted for a collapsing deformation through uniform creasing of walls thereof. alternatively, the second portion may comprise a pair of bifurcated beam sections which are adapted to bend away from each other by buckling under a compressive load, or a main beam section and an auxiliary beam section which guides a direction of a buckling deformation of the main beam section.

According to a preferred embodiment of the present invention, the longitudinal member comprises a side member extending from each side of an engine room to a lower part of a passenger compartment floor.

BRIEF DESCRIPTION OF THE DRAWINGS

Now the present invention is described in the following with reference to the appended drawings, in which:

FIG. 8 is a graph showing the time history of the change in the deceleration at the time of a vehicle crash in the second embodiment of the present invention;

DETAILED DESCRIPTION OF THE PREFERRED EMBODIMENTS

Figure 1:
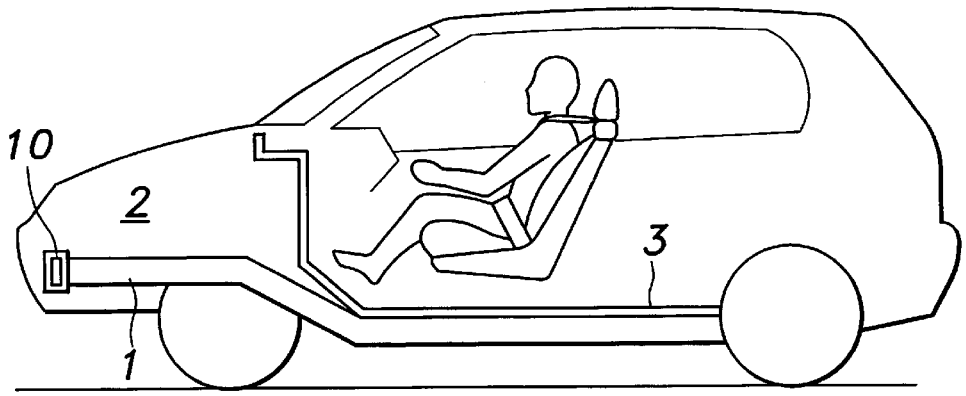
FIG. 1 is a schematic side view of a vehicle body embodying the present invention.

FIG. 1 shows the outline of an automotive side member embodying the present invention. This side member 1, for instance, consists of an aluminum alloy extruded member, and extends in the longitudinal direction from each side of an engine room 2 to a lower part of a passenger compartment floor 3. The material for the side member 1 as well as other members is not limited to the extruded aluminum alloy mentioned above, but may also consist of other materials which may be also worked in different manners.

Figure 2:
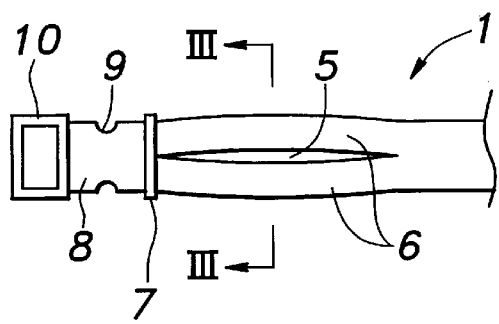
FIG. 2 is a side view of an essential part of a side member of the present invention.
Figure 3:
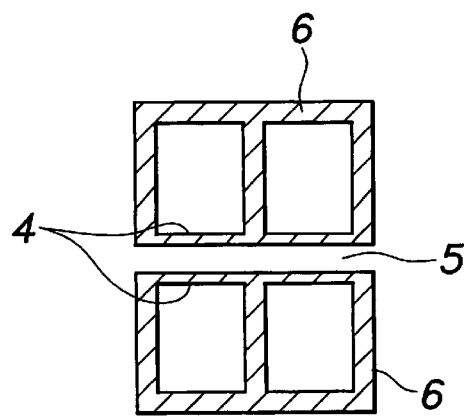
FIG. 3 is a sectional view taken along line III—III of FIG. 2.

Referring to FIGS. 2 and 3, the side member 1 consists of a hollow rod member having a two-by-two box-shaped cross section, and includes a bifurcated beam or bent portion 6 defined by a slit 5 centrally separating the thickness of a horizontal rib 4 provided in a vertically middle part of the cross section over a certain longitudinal direction, and slightly opened in a longitudinally middle part thereof, and a relatively short collapsing portion 8 connected to a front end of the bent portion 6 via a thrust plate 7.

The collapsing portion 8 (i.e., the first portion of the side member 1) is provided with stress concentration portions 9 defined by beads, notches or the likes to lower the initiation load for compressive deformation (i.e., yield i.e., stress) to near the average reaction load (plastic deformation stress). The front end of the collapsing portion 8 is connected to a bumper beam 10 extending laterally across the width of the vehicle body. Examples of members which may serve as the collapsing portion 8 may be found in various prior publications (Japanese patent laid open publications Nos. 7-101354, 4-310477, and 58-89475, and Japanese UM laid open publication No. 5-12361). The contents of these prior Japanese patent and UM applications are hereby incorporated in this application by reference.

The average reaction load that is produced as the collapsing portion 8 undergoes a plastic deformation is selected so as to be slightly lower than the load which would initiate a buckling deformation of the bent portion 6 of the side member 1 under a compressive load, and the average reaction load that is produced during the deformation of the bent portion 6 is selected so as to be substantially smaller than the average reaction load of the collapsing portion 8.

The bent portion 6 (i.e., the second portion of the side member 1) is not limited to a combination of a pair of beams which are symmetric about a horizontal line, but may also consist of a single beam and achieve the same function. It is however desirable to use a pair of beams in view of accomplishing a stable buckling deformation under a horizontal load from the front end. Depending on the overall structure of the vehicle, the beam may be allowed to undergo a buckling or bending deformation in a horizontal plane.

Figure 4A:
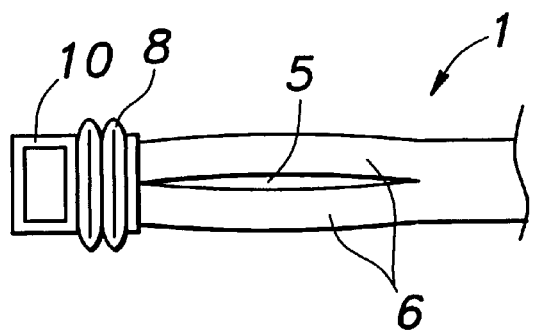
FIGS. 4a to 4c are schematic side views showing the deformation process of the side member at the time of a vehicle crash.
Figure 4B:
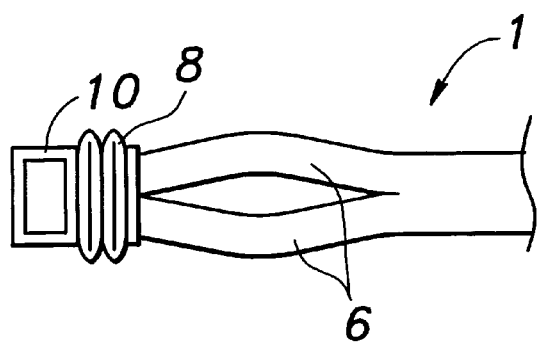
Figure 4C:
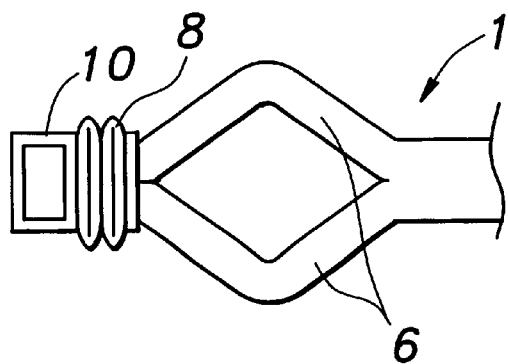

The deformation process of the above mentioned side member 1 is described as follows with respect to a case of a frontal crash onto a fixed structure on the road with reference to FIGS. 4 and 5.

During an initial phase of a crash, a rearwardly directed reaction load due to the inertia of the vehicle body acts upon the collapsing portion 8 on the front end of the side member 1. This causes a stress of an elastic region in the collapsing portion 8, and the deceleration rises sharply until the deformation initiating load (i.e., yield stress) is reached (interval a in FIG. 5). The collapsing portion 8 is provided with stress concentration portions 9 to lower the deformation initiating load, and is adapted to undergo a compressive deformation (see FIG. 4a) while demonstrating a constant reaction load (stress in a plastic region) over the entire stroke so as to maintain a certain deceleration level (interval b in FIG. 5). The bent portion 6 is also subjected to the same load, but because the average reaction load of the collapsing portion 8 is selected to be lower than the deforming initiating load of the bent portion 6, the bent portion 6 would not start deformation as long as the collapsing portion 8 continues to deform.

Figure 5:
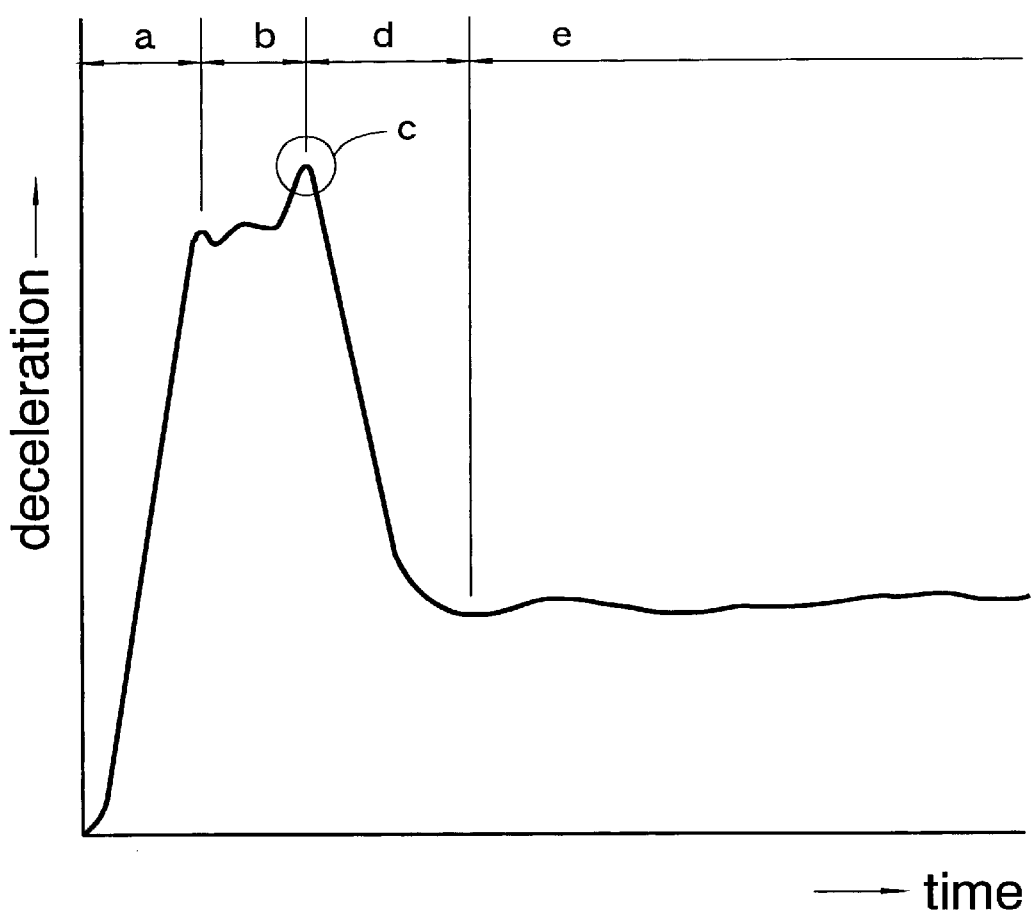
FIG. 5 is a graph showing the time history of the change in the deceleration at the time of a vehicle crash.

Towards the end of the deformation stroke of the collapsing portion 8 during an intermediate phase of the crash, the reaction load starts increasing due to work-hardening of the collapsing portion 8 until the yield point of the bent portion 6 is reached, causing a temporary increase in the deceleration (point c in FIG. 5). As soon as the bent portion 6 begins a buckling deformation (see FIG. 4b), the reaction load rapidly diminishes to the level of the plastic bending stress of the bent portion 6 (interval d in FIG. 5). If the elongation of the seat belt reaches the peak level in the interval of the rapid reduction in the vehicle body deceleration, it is possible to substantially reduce the deceleration acting on the vehicle occupant. As the bending angle of the bent portion 6 increases and the deformation of the side member 1 progresses (see FIG. 4c), a constant reaction load is continually produced so that the deceleration level is kept at a constant value (interval e in FIG. 5).

The ratio of the deformation initiating load and the average reaction load of the bent portion 6 can be selected at will by suitably selecting the initial configuration of the bent portion 6.

During the final phase of the crash, the deceleration of the vehicle body increases due to the contribution from the reaction produced by the completion of the deformation of the engine room 2. However, at this point, because the inertial force of the vehicle occupant has been substantially eliminated, the difference in deceleration between the vehicle body and the vehicle occupant is so small that such an increase in deceleration does not substantially affect the vehicle occupant.

Now a second embodiment of the present invention is described in the following with reference to FIGS. 6 and 7.

The parts corresponding to those of the previous embodiment are denoted with like numerals without repeating description thereof.

Figure 6:
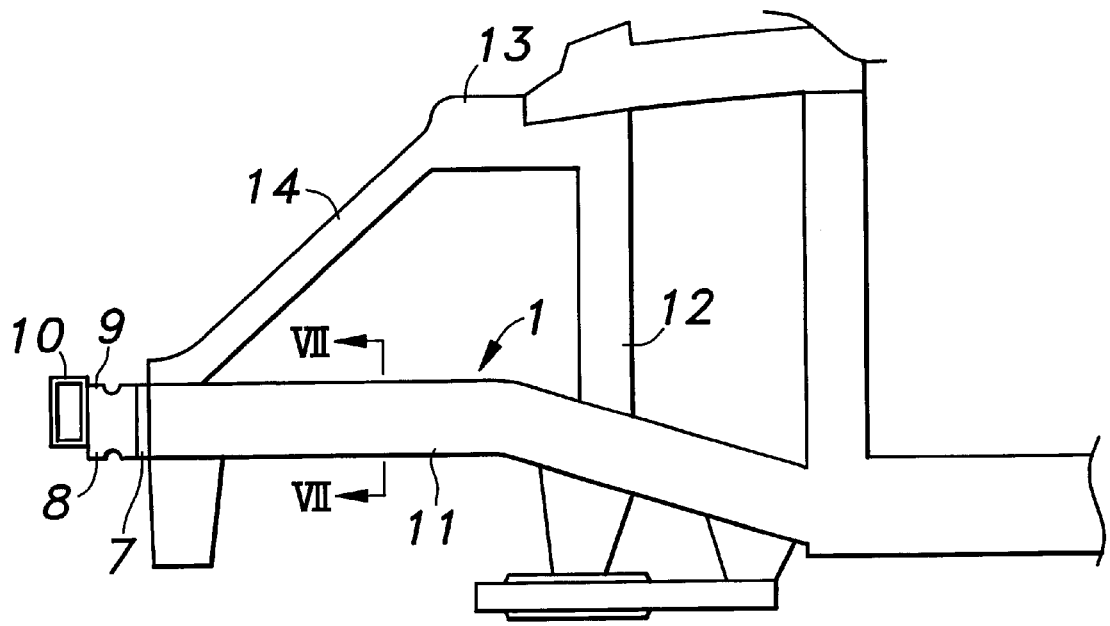
FIG. 6 is a side view of an essential part of a side member of a second embodiment of the present invention.
Figure 7:
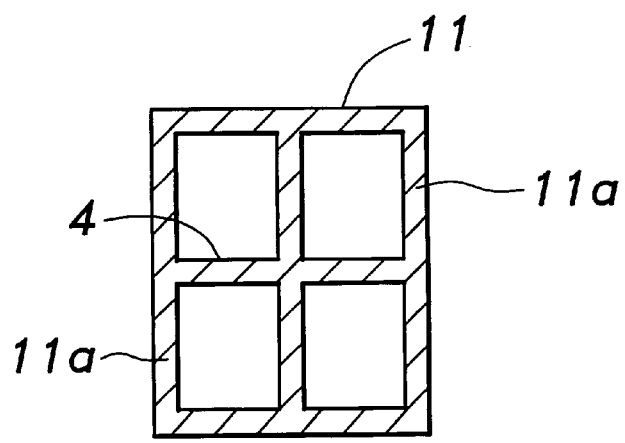
FIG. 7 is a sectional view taken along line VII—VII of FIG. 6.

In the second embodiment, as shown in FIG. 6, a bent portion 11 corresponding to the second portion of the side member 1 which extends within the engine room is formed as a single beam without any slit. Therefore, the bent portion 11 has a two-by-two box-shaped cross section as shown in FIG. 7, but its horizontal rib 4 is not separated.

The frame structure of this embodiment comprises a vertical member 12 which stands vertically upright from the side member 1 at the interface between the engine room and the passenger compartment, an upper horizontal member 13 which extends forwardly from an upper end of the vertical member 12 over a small length, and an upper member 14 which extends across a terminal end of the horizontal member 13 and the upper surface of the forward end of the bent portion 11. These members may be joined to each other by welding.

Thus, the bent portion 11 and the upper member 14 can jointly produce a same effect as the bifurcated beam 6 of the first embodiment. By using a relatively large wall thickness for the side member, the deformation initialing load of the bent portion 11 can be increased so that the collapsing portion 8 may start deforming before the bent portion 11 does.

The deformation process of the side member 1 of the second embodiment is now described in the following with reference to FIGS. 8 and 9 which correspond to FIGS. 4 and 5, respectively, of the previous embodiment. The regions a, b, c, d and e of FIG. 8 correspond to those of FIG. 5.

Figure 9A:
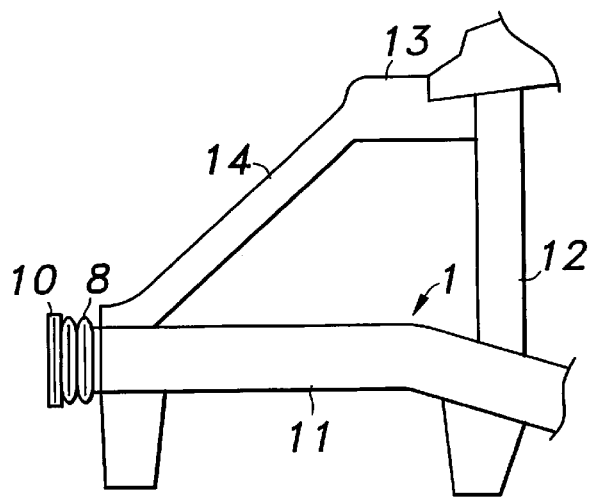
FIGS. 9a to 9c are schematic side views showing the deformation process of the side member of the second embodiment of the present invention at the time of a vehicle crash.
Figure 9B:
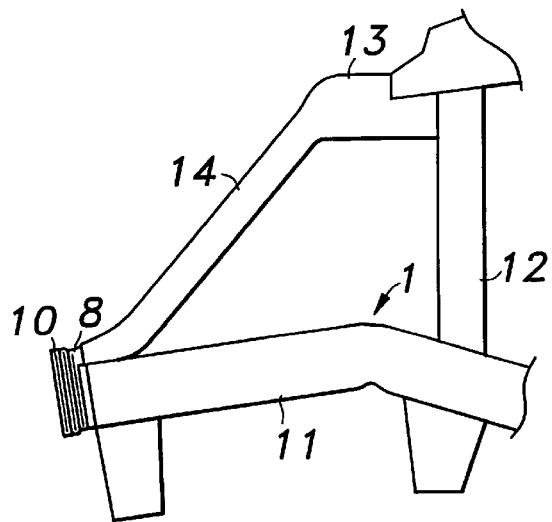

A vehicle body deceleration history similar to that shown in the intervals a and b of FIG. 5 takes place in the intervals a and b shown in FIG. 8 due to the deformation of the collapsing portion 8 as shown in FIG. 9, and the acceleration similarly demonstrates a temporary increase due to work-hardening of the collapsing portion 8 in the region c of FIG. 8. The bending deformation of the bent potion 11 starts upon completion of the collapsing of the collapsing portion 8 as shown in FIG. 9b, and the vehicle body deceleration sharply drops as indicated by the interval d in FIG. 8 in a similar manner as mentioned earlier with reference to FIG. 5. In the second embodiment, because of the provision of the upper member 14, the front end of the side member 1 has a tendency to undergo a downward bending deformation as indicated in FIG. 9b. If an engine is mounted on the bent portion 11 the upper member 14 may be omitted, as the engine creates a tendency for the bent portion 11 to undergo a downward bending deformation.

Figure 9C:
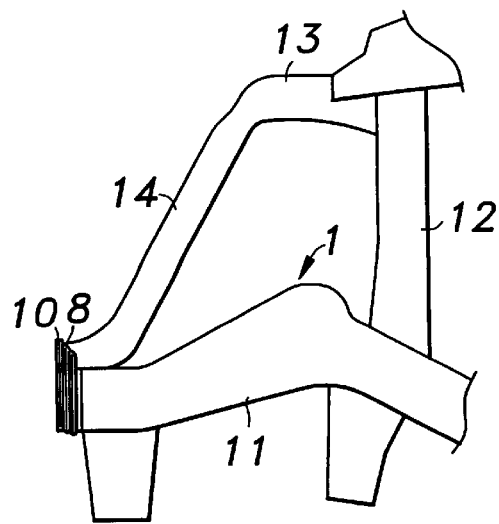

When the bending stress in the plastic region begins, following the start of the bending deformation of the bent portion II as shown in FIG. 9c, the vehicle body deceleration stays higher than the bottom level of the interval d of FIG. 8, as shown in the interval e of FIG. 8. In this embodiment, the average reaction load of the collapsing portion 8 is selected lower than the deformation initiating load of the bent portion 11 (by properly selecting the wall thickness of the side member 1), and the ratio of the deceleration at the time of compressive deformation of the collapsing portion 8 to the deceleration at the time of the bending deformation of the bent portion 11 is maximized so that the vehicle body deceleration during the bending deformation of the bent portion 11 may be substantially smaller than the vehicle body deceleration during the collapsing of the collapsing portion 8 as indicated by the interval e in FIG. 8. As a result, the maximum level of the vehicle occupant deceleration is made to occur in the latter half of the interval e (as indicated by the imaginary line in FIG. 8), and is lowered in value at the same time.

Thus, according to a first aspect of the present invention, the time history of the reaction force can be adjusted by sequentially changing the deformation mode of the reaction force generating member from compression (collapsing) to bending (buckling) so that the deceleration of the passenger compartment of the vehicle body can be sharply increased in an early phase of a vehicle crash, and, following an interval of a sharp decline, can be kept at a substantially constant level. In particular, by providing a stress concentration portion in the first portion so as to bring the deformation initiating load near to the average reaction load, the deformation initiating load can be reduced, and the reaction load can be kept at a substantially same level over the entire deformation stroke. Therefore, the peak value of the deceleration acting on the vehicle occupant can be minimized for a given deformation stroke, as compared to the conventional structure. Furthermore, because the displacement of the vehicle occupant inside the passenger compartment can be minimized, the risk of the vehicle occupant sustaining an injury from a secondary impact upon a fixed structure of the passenger compartment can be reduced.

Figure 10:
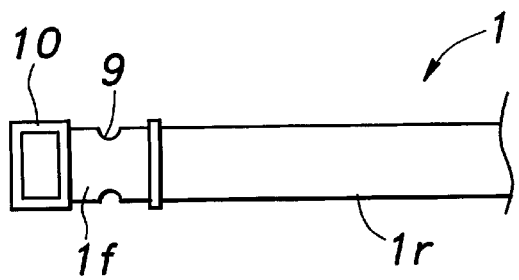
FIG. 10 is a view similar to FIG. 2 showing a third embodiment of the present invention.

FIG. 10 shows a side member 1 for a third embodiment of the present invention. The side member 1 consists of a hollow rod member extending along each side of the engine room 2 and having a suitable cross section, and, in particular, includes first and second portions $1f$ and $1r$ which are connected in series and have different longitudinal dimensions and compressive strengths.

The first portion or the front portion $1f$ of these two portions is relatively short in length, and is given with a plastic deformation stress which is higher than the plastic deformation stress of the second portion or the rear portion $1r$. Furthermore, the front portion $1f$ is provided with stress concentration portions 9 consisting of beads, notches or the like so as to start collapsing under a compressive load close to the plastic deformation stress, and therefore reaches a elasticity limit well before reaching a normal yield point. As a result, a collapsing initiating stress of the front portion $1f$ is lower than the yield point stress of the rear portion $1r$. The front end of the front portion $1r$ is connected to a bumper beam 10 extending laterally across the width of the vehicle body.

Figure 11A:
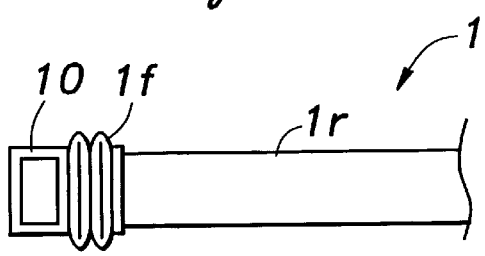
FIGS. 11a to 11c are schematic side views showing the deformation process of the side member of the third embodiment of the present invention at the time of a vehicle crash.
Figure 11B:
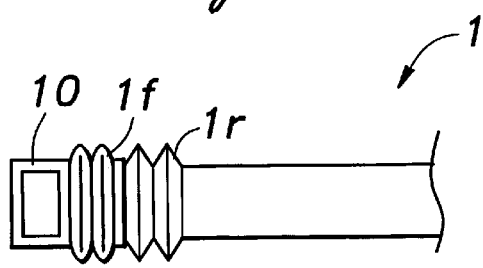
Figure 11C:
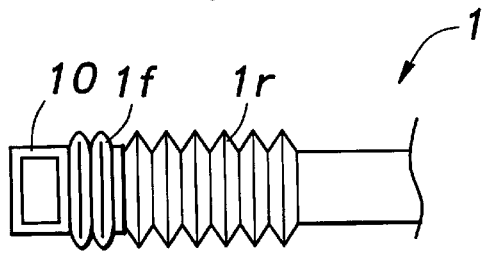

The deformation process of the above mentioned side member 1 is described in the following with respect to a case of a frontal crash onto a fixed structure on the road with reference to FIGS. 11 and 12.

Figure 12:
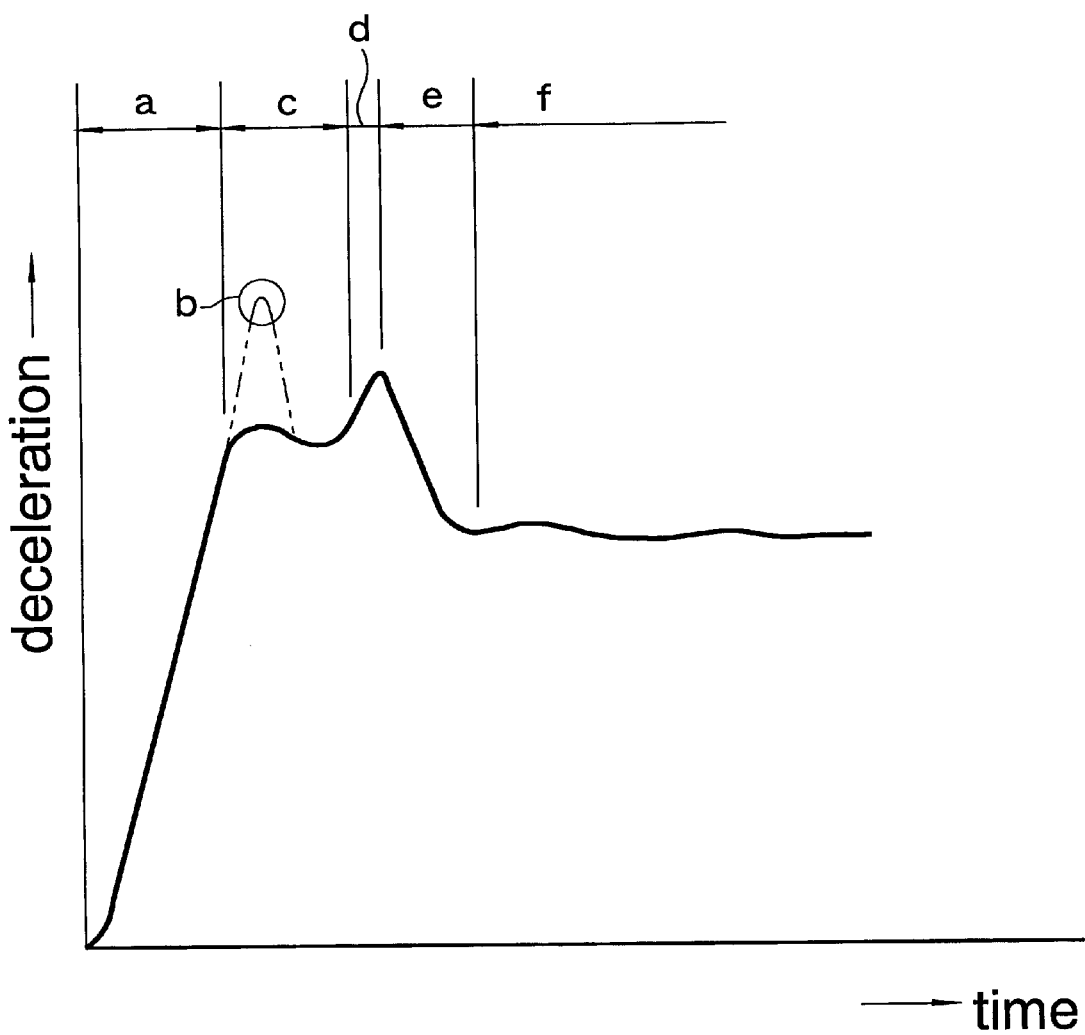
FIG. 12 is a graph showing the time history of the change in the deceleration at the time of a vehicle crash in the third embodiment of the present invention.

When a rearwardly directed reaction load due to the inertia of the vehicle body acts upon the side member 1, a compressive stress within an elastic deformation range is initially produced in the side member, and this causes a sharp increase in deceleration (interval a in FIG. 12). Then, the front portion $1f$ starts a plastic deformation because the front portion $1f$ is adapted to collapse at a load lower than a normal yield point stress (point b of FIG. 12) and lower than the yield point stress of the rear portion $1r$ by virtue of the stress concentration portions 9. Thus, the front portion $1f$ undergoes a compressive deformation while producing a constant stress (see FIG. 11a), and maintains a certain deceleration (interval c in FIG. 12).

The rear portion $1r$ is subjected to the same compressive load during this phase, but because the yield point stress of the rear portion $1r$ is higher than the plastic deformation stress of the front portion $1f$, the rear portion $1r$ remains within an elastic limit while the front portion 1f continues a plastic deformation, without itself undergoing any plastic deformation.

Towards the end of the deformation stroke of front portion 1f during an intermediate phase of the crash, the stress of the front portion if increases due to work-hardening, and this causes a temporary increase in the deceleration (interval d in FIG. 12). In the meantime, the stress of the rear portion 1r reaches a yield point, and the rear portion 1r starts a plastic deformation (see FIG. 11b). As a result, the deceleration drops to a level corresponding to the plastic deformation stress of the rear portion (interval e of FIG. 12). If the elongation of the seat belt reaches the peak level during this interval of reduction in the vehicle body deceleration, it is possible to substantially reduce the deceleration acting on the vehicle occupant. As the deformation of the rear portion 1r progresses (see FIG. 11c), a constant stress continues to be produced, and the deceleration level is kept at a constant value (interval f in FIG. 12).

During the final phase of the crash, the deceleration of the vehicle body increases due to the contribution from the reaction produced by the completion of the deformation of the engine room 2. However, at this point, because the inertial force of the vehicle occupant has been substantially eliminated, and the difference in deceleration between the vehicle body and the vehicle occupant is so small that such an increase in deceleration does not substantially affect the vehicle occupant.

Thus, according to a second aspect of the present invention, the relationship between the yield point stress (i.e., deformation initiating load) and the plastic deformation stress can be adjusted in such a manner that the deceleration of the passenger compartment of the vehicle body can be sharply increased in an early phase of a vehicle crash, and allowed to fall during an intermediate phase of the crash and thereafter. Therefore, the peak value of the deceleration acting on the vehicle occupant can be minimized for a given deformation stroke, as compared to the conventional structure. Furthermore, because the displacement of the vehicle occupant inside the passenger compartment can be minimized, the risk of the vehicle occupant sustaining an injury from a secondary impact upon a fixed structure of the passenger compartment can be reduced.

Although the present invention has been described in terms of preferred embodiments thereof, it is obvious to a person skilled in the art that various alterations and modifications are possible without departing from the scope of the resent invention which is set forth in the appended claims.

What is claimed is:

1. An automotive vehicle body structure, comprising a longitudinal member including a first portion and a second portion connected in series to provide a controlled reaction force at the time of a vehicle crash, characterized by that:

the first portion has a first deformation initiating load and a first deformation load; and the second portion has a second deformation initiating load which is higher than the first deformation initiating load and the first deformation load, and a second deformation load which is lower than the first deformation initiating load and the first deformation load;

whereby upon occurrence of a vehicle crash, the first portion deforms during an early phase of the vehicle crash, and upon completion of the deformation of the first portion, the second portion starts deforming, and maintains the second deformation load during a late phase of the vehicle crash.

2. An automotive vehicle body structure according to claim 1, wherein the first portion comprises a longitudinally extending hollow member which is adapted for a collapsing deformation through uniform creasing of walls thereof.

3. An automotive vehicle body structure according to claim 1, wherein the first portion is provided with a stress concentration portion for lowering the deformation initiating load of the first portion.

4. An automotive vehicle body structure according to claim 1, wherein the second portion comprises a longitudinally extending hollow member which is adapted for a collapsing deformation through uniform creasing of walls thereof.

5. An automotive vehicle body structure according to claim 1, wherein the second portion comprises a pair of bifurcated beam sections which are adapted to bend away from each other by buckling under a compressive load.

6. An automotive vehicle body structure according to claim 1, wherein the second portion comprises a main beam section and an auxiliary beam section which guides a direction of a buckling deformation of the main beam section.

7. An automotive vehicle body structure according to claim 1, wherein the longitudinal member comprises a side member extending from each side of an engine room to a lower part of a passenger compartment floor.

8. An automotive vehicle body structure according to claim 1, wherein the longitudinal member comprises a extruded member made of an aluminum alloy.

* * * * *